US010636166B1

United States Patent
Armstrong et al.

(10) Patent No.: US 10,636,166 B1
(45) Date of Patent: Apr. 28, 2020

(54) SYSTEM AND METHOD FOR CORRELATION BETWEEN 2D AND 3D SCENES

(71) Applicant: Rockwell Collins, Inc., Cedar Rapids, IA (US)

(72) Inventors: Michael J. Armstrong, Central City, IA (US); Scott E. Schultz, Cedar Rapids, IA (US); Matthew J. Cunnien, Lino Lakes, MN (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 229 days.

(21) Appl. No.: 15/491,817

(22) Filed: Apr. 19, 2017

(51) Int. Cl.
| | |
|---|---|
| *G06K 9/00* | (2006.01) |
| *G06T 7/73* | (2017.01) |
| *G06K 9/20* | (2006.01) |
| *G06T 7/32* | (2017.01) |
| *G06T 7/33* | (2017.01) |
| *B64D 43/00* | (2006.01) |
| *B64D 47/08* | (2006.01) |

(52) U.S. Cl.
CPC .............. *G06T 7/74* (2017.01); *B64D 43/00* (2013.01); *B64D 47/08* (2013.01); *G06K 9/0063* (2013.01); *G06K 9/2063* (2013.01); *G06T 7/32* (2017.01); *G06T 7/337* (2017.01); *G06T 2207/10032* (2013.01)

(58) Field of Classification Search
None
See application file for complete search history.

(56) References Cited

U.S. PATENT DOCUMENTS

| | | | | |
|---|---|---|---|---|
| 2011/0064312 | A1* | 3/2011 | Janky | G01C 15/00 382/195 |
| 2014/0019302 | A1* | 1/2014 | Meadow | G06K 9/32 705/26.61 |
| 2016/0139781 | A1* | 5/2016 | Unnikrishnan | G01C 21/3664 715/805 |

(Continued)

OTHER PUBLICATIONS

Schiefele, Jens, et al. "Flitedeck 3D on the MX20." Enhanced and Synthetic Vision 2002. vol. 4713. International Society for Optics and Photonics, 2002. (Year: 2002).*

(Continued)

*Primary Examiner* — Sean M Conner
(74) *Attorney, Agent, or Firm* — Donna P. Suchy

(57) ABSTRACT

Systems and methods for correlating visual content in 2D and 3D scenes of a geographical region can include at least one data source for providing geographical data, a display device of an aircraft, and a processor. The display device can display a 2D view and a 3D view representing top-down views of the geographical region using data received from the data source(s). The processor(s) can identify a first image point within the 2D view referenced by a first cursor of the 2D view. The processor(s) can determine, using information received from the at least one data source, a geographical location corresponding to the first image point. The processor(s) can determine a second image point within the 3D view corresponding to the determined geographical location. The processor(s) can position a second visual indicator of the 3D view to reference the determined second image point within the 3D view.

20 Claims, 5 Drawing Sheets

(56) References Cited

U.S. PATENT DOCUMENTS

2017/0200309 A1* 7/2017 Qian ................... G06T 15/04
2017/0309060 A1* 10/2017 John ................... B64D 43/00

OTHER PUBLICATIONS

Uchiyama, Hiroyuki, et al. "Removal of moving objects from a street-view image by fusing multiple image sequences." 2010 20th International Conference on Pattern Recognition. IEEE, 2010. (Year: 2010).*

* cited by examiner

SYSTEM AND METHOD FOR CORRELATION BETWEEN 2D AND 3D SCENES

BACKGROUND

Aircrafts are usually equipped with vision systems to provide perspective views of the environment around the aircraft for presentation on one or more display devices of an aircraft. The displayed perspective views can help aircraft crew to navigate the respective aircraft or locate regions or objects of interest in the surrounding environment. For example, for an aircraft flying in relatively close proximity to terrain, the respective crew may have difficulty determining present horizontal depth perception relative to surrounding terrain and environment. Also, for fighter jets, helicopters, drones, or military jets, some situations may call for accurate localization of a target object within a geological or urban environment.

A vision system of an aircraft providing visual information that allows identification and localization of objects and structures within an environment extending beyond the location directly underneath the aircraft can greatly enhance the capability of that aircraft. Such visual information can help in decision making with regard to selecting or changing the aircraft trajectory, or releasing rockets or ammunition.

SUMMARY

In one aspect, the inventive concepts disclosed herein are directed to a system for correlating visual content in two-dimensional (2D) and three-dimensional (3D) scenes of geographical regions. The system can include at least one data source for providing geographical data, a display device of an aircraft, and at least one processor. The display device of the aircraft can display a 2D view and a 3D view of a geographical region using data received from the at least one data source. The 2D and 3D views can be representative of top-down views of the geographical region. The at least one processor can be communicatively coupled to the at least one data source and the display device. The at least one processor can identify a first image point within the 2D view referenced by a first cursor of the 2D view. The at least one processor can determine, using information received from the at least one data source, a geographical location, corresponding to the first image point, in the geographical region. The at least one processor can determine a second image point within the 3D view corresponding to the determined geographical location. The at least one processor can position a second cursor of the 3D view at the determined second image point within the 3D view.

In some embodiments, determining the geographical location can include the at least one processor using the information from the at least one data source to determine a second geographical location in the geographical region corresponding to a reference pixel of the 2D view. The at least one processor can determine a position of a second pixel, corresponding to the first image point, relative to the reference pixel within the 2D view. The at least one processor can determine the geographical location in the geographical region using the second geographical location in the geographical region, the position of the second pixel within the 2D view relative to the reference pixel, and a scaling value associated with the 2D view. In some embodiments, determining a geographical location in the geographical region corresponding to the first image point can include the at least one processor using a mapping to determine the geographical location in the geographical region. The mapping can link each pixel of the 2D view to a corresponding geographical location in the geographical region.

The at least one processor can be further configured to cause the display device to display coordinates of the determined geographical location corresponding to the first image point on the 3D view. The at least one processor can further cause the display device to display, on the 2D view, an indication of a region of the geographical region displayed in the 3D view. The 2D and the 3D views can represent synthetic views of the geographical region. The at least one processor can be further configured to repeat, for a plurality of frames of the 2D view (1) identifying the first image point referenced by the first cursor, (2) determining the geographical location, in the geographical region, corresponding to the identified first image point, (3) determining the second image point within the 3D view corresponding to the determined geographical location, and (4) positioning the second cursor of the 3D view at the determined second image point within the 3D view.

In some embodiments, the at least one data source can include a plurality of cameras mounted to the aircraft and capturing content used to generate the 3D view. In determining a second image point within the 3D view corresponding to the geographical location, the at least one processor can determine, using position and angle of view of each of the plurality of cameras, a second geographical location in the geographical region corresponding to a reference pixel of the 3D view. The at least one processor can determine a distance between the geographical location and the second geographical location in the geographical region. The at least one processor can determine the second image point within the 3D view using the determined distance, the second geographical location in the geographical region, and a scaling value associated with the 3D view.

In a further aspect, the inventive concepts disclosed herein are directed to a method of correlating visual content in two-dimensional (2D) and three-dimensional (3D) scenes of geographical regions. The method can include a display device of an aircraft displaying a 2D view and a 3D view of a geographical region using data received from at least one data source. The 2D and 3D views can represent top-down views of the geographical region. The method can include at least one processor identifying a first image point within the 2D view referenced by a first cursor of the 2D view. The method can include the at least one processor determining, using information from the at least one data source, a geographical location in the geographical region corresponding to the first image point. The method can include the at least one processor determining a second image point within the 3D view corresponding to the geographical location in the geographical region. The method can include the at least one processor positioning a second cursor at the determined second image point within the 3D view.

In some embodiments, determining the geographical location can include the at least one processor determining a second geographical location in the geographical region corresponding to a reference pixel of the 2D view, using the information from the at least one data source. The at least one processor can determine a position of a second pixel, corresponding to the first image point, relative to the reference pixel within the 2D view. The at least one processor can determine the geographical location in the geographical region using the second geographical location in the geographical region, the position of the second pixel within the 2D view relative to the reference pixel, and a scaling value associated with the 2D view. In some example embodiments, determining a geographical location in the geographical region corresponding to the first image point can include the at least one processor using a mapping to determine the geographical location in the geographical region. The mapping can link each pixel of the 2D view to a corresponding geographical location in the geographical region.

The method can further include the at least one processor causing the display device to display coordinates of the determined geographical location corresponding to the first image point on the 3D view. The method can further include the at least one processor causing the display device to display, on the 2D view, an indication of a region of the geographical region displayed in the 3D view. The 2D and the 3D views can represent synthetic views of the geographical region. The method can further include the at least one processor repeating, for a plurality of frames of the 2D view (1) identifying the first image point referenced by the first cursor, (2) determining the geographical location, in the geographical region, corresponding to the identified first image point, (3) determining the second image point within the 3D view corresponding to the determined geographical location, and (4) positioning the second cursor of the 3D view at the determined second image point within the 3D view.

In some embodiments, the at least one data source can include a plurality of cameras mounted to the aircraft and capturing content used to generate the 3D view. The method can include the at least one processor determining a second image point within the 3D view corresponding to the geographical location, and determining a second geographical location in the geographical region corresponding to a reference pixel of the 3D view, using position and angle of view of each of the plurality of cameras. The at least one processor can determine a distance between the geographical location and the second geographical location in the geographical region. The at least one processor can determine the second image point within the 3D view using the determined distance, the second geographical location in the geographical region, and a scaling value associated with the 3D view.

In a further aspect, the inventive concepts disclosed herein are directed to a non-transitory computer readable medium including computer executable instructions stored thereon. The computer executable instructions, when executed by at least one processor, cause the at least one processor to monitor display of a 2D view and a 3D view of a geographical region on a display device of an aircraft. The 2D and 3D views can be displayed using data received from at least one data source. The 2D and 3D views can represent top-down views of the geographical region. The at least one processor can identify a first image point within the 2D view referenced by a first cursor of the 2D view. The at least one processor can determine, using information from the at least one data source, a geographical location in the geographical region corresponding to the first image point. The at least one processor can determine a second image point within the 3D view corresponding to the geographical location in the geographical region. The at least one processor can position a second cursor at the determined second image point within the 3D view.

In some embodiments, the 2D and the 3D views may represent synthetic views of the geographical region.

BRIEF DESCRIPTION OF THE DRAWINGS

Embodiments of the inventive concepts disclosed herein will become more fully understood from the following detailed description, taken in conjunction with the accompanying drawings, wherein like reference numerals refer to like elements, in which.

Figure 1:
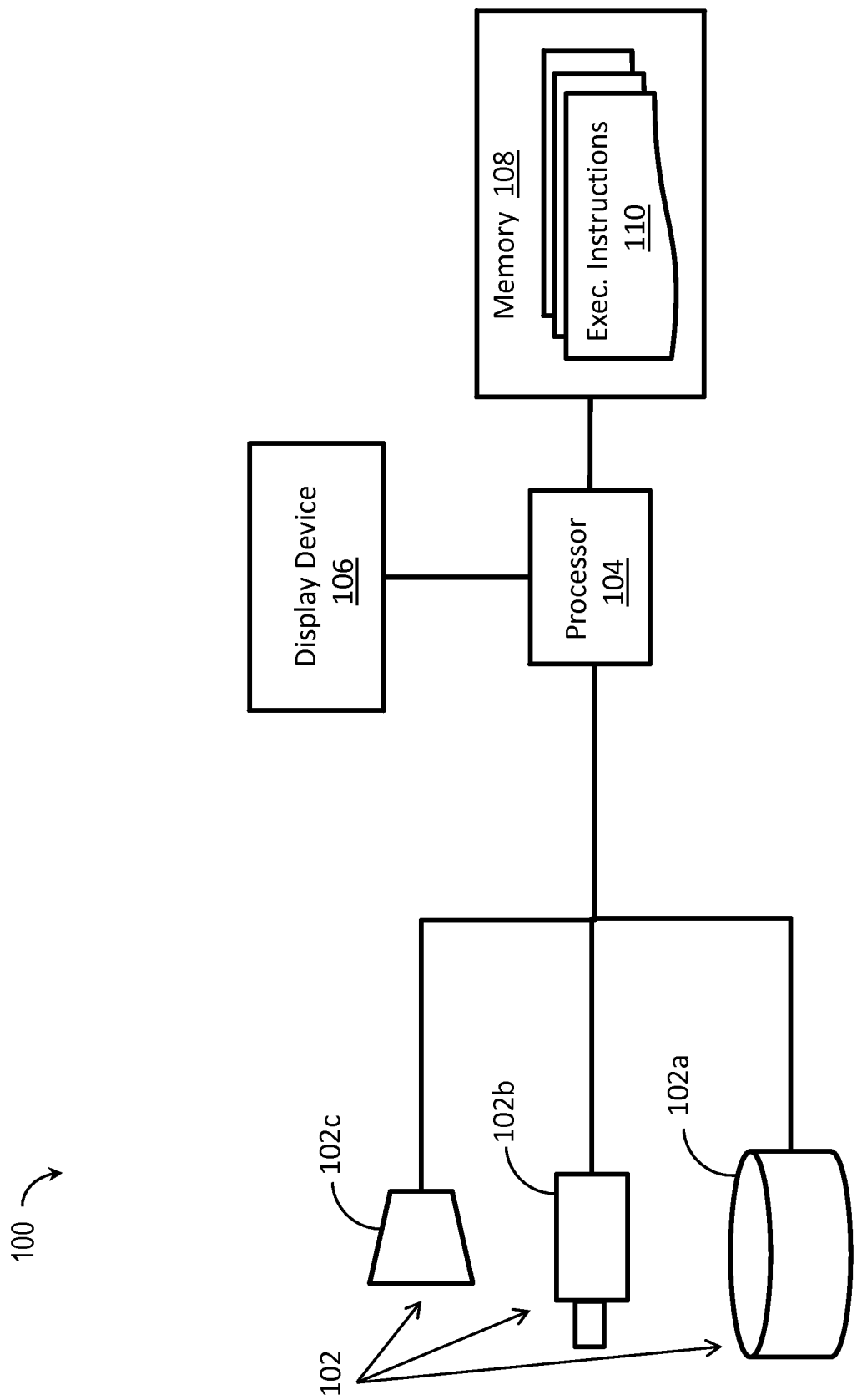
FIG. 1 is a block diagram illustrating a vision system capable of correlating visual content in two-dimensional (2D) and three-dimensional (3D) views of a geographical region. in accordance with some embodiments of the inventive concepts of this disclosure.

The details of various embodiments of the methods and systems are set forth in the accompanying drawings and the description below.

DETAILED DESCRIPTION

Before describing in detail embodiments of the inventive concepts disclosed herein, it should be observed that the inventive concepts disclosed herein include, but are not limited to a novel structural combination of components and circuits, and not to the particular detailed configurations thereof. Accordingly, the structure, methods, functions, control and arrangement of components and circuits have, for the most part, been illustrated in the drawings by readily understandable block representations and schematic diagrams, in order not to obscure the disclosure with structural details which will be readily apparent to those skilled in the art, having the benefit of the description herein. Further, the inventive concepts disclosed herein are not limited to the particular embodiments depicted in the diagrams provided in this disclosure, but should be construed in accordance with the language in the claims.

A vision system of an aircraft can be configured to provide various views of geographical regions of interest or flown over by the aircraft. The various views may be of different types or associated with distinct geographic data sources. For example, the vision system can provide two-dimensional (2D) and three-dimensional (3D) views of the environment (or geographical region) around the aircraft for display one or more display devices of the aircraft. Both views can contain depictions of the same objects or structures, such as mountains or hills, lakes, buildings, antenna systems, monuments, or the like. The vision system can generate the 2D and 3D views using geographical data from a single source or multiple sources. Geographical data used to generate the 2D and 3D views can include digital maps, satellite images, images captured by cameras or imaging sensors mounted on the aircraft, or a combination thereof.

By providing various perspectives views of the environment (or geographical region) surrounding the aircraft, the vision system can allow the aircraft crew (or users in general) to have a better visual perception or understanding of the environment. However, the various views may also lead to visual confusion or ambiguity. In particular, potential differences between the 2D and 3D views may make it difficult to correlate the content of both views. The difference in view scale, angle of view, geographical data used to generate each view, or depth cues associated with each view can make it difficult for a user (or a viewer) to locate or track the same object in both views. For example, depending on the angle of view, a target object or a region of interest can be hidden within the 3D view behind another structure or object (e.g., a hill, mountain, or a building). Also, the difference in view scale and depth cues can make it difficult to judge how far into the scene an object is. These technical difficulties can hinder the benefits of providing 2D and 3D views of the environment around the aircraft.

Systems and methods described herein allow for automatically correlating objects or structures within both the 2D and 3D views. For instance, given an object or a region of interest (ROI) that is selected or identified in one of the views (e.g., the 2D and 3D views), the vision system can localize the object or the ROI in the other view and display a visual indicator to visually point to the object or the ROI in the other view. The visual indicator can be a cursor, an overlay, a transparent shading, a graphical object (e.g., a circular, square or rectangular contour). The correlation between content of the 2D and 3D views can be viewed as a spatial synchronization of visual indicators (e.g., cursors, overlays, transparent shadings, graphical objects, or a combination thereof) in the 2D and 3D views such that the visual indicators in both views point to the same physical object or ROI. The vision system can also display an indication of the field of view (FOV) of the 3D view within the 2D view or an indication of the FOV of the 2D view within the 3D view. The vision system can also display, in relation with the 2D or 3D view, textual data indicative of geographical or other information associated with the physical object or ROI.

By correlating content in the 2D and 3D views, the vision system can significantly improve user experience and enhance the value of the visual data presented by the vision system. For instance, by spatially synchronizing visual indicators pointing to the physical object or ROI within the 2D and 3D views, the vision system facilitates identification or localization of the physical object or ROI without significant manual or mental effort on the part of users of the vision system. For aircraft or helicopter pilots or users controlling flying drones, automatic spatial and time synchronization of visual indicators pointing to regions or objects of interest within displayed 2D and 3D views provides a more comprehensive visual perspective of the surrounding environment and helps in timely making and executing navigation or other operation decisions. For example, given a flight mission, the visual data provided by the vision system can help users make timely decisions with regard to change of trajectory, releasing missiles or ammunition, or initiating data collection processes.

While embodiments described herein relate mainly to vision systems of an aircraft, the systems, devices, methods, and software applications described herein can be employed with regard to airplanes, helicopters, fighter jets, or drones. Also, as used herein, the term aircraft encompasses civilian and military airplanes, helicopters, fighter jets, and drones. Also visual or graphical indicators used to point to an object or region of interest within the 2D or 3D views are not to be restricted to cursors and can include cursors, overlays, shading or color change, graphical contours, other graphical objects, or a combination thereof. Further, the systems, devices, methods, and software applications described herein can apply content correlation (or visual indicators' synchronization) either way between the 2D and 3D views. For instance, the content correlation can include localizing and visually pointing to an object or ROI within the 3D view that corresponds to another identified object or ROI within the 2D view, or localizing and visually pointing to an object or ROI within the 2D view that corresponds to another identified object or ROI within the 3D view. In addition, the systems, devices, methods, and software applications described herein can apply content correlation between any number of 2D and 3D views.

Referring now to the drawings and to FIG. 1 in particular, a block diagram illustrating a vision system 100 capable of correlating visual content in two-dimensional (2D) and three-dimensional (3D) views of a geographical region is shown in accordance with some embodiments of the inventive concepts of this disclosure. The vision system 100 includes data sources 102a-102c (referred to herein after individually or collectively as data source(s) 102) for providing geographical data, a processor 104, a display device 106, and a memory 108 storing computer executable instructions 110 thereon. The processor 104 is communicatively coupled to the data sources 102, the display device 106, and the memory 108. The processor 104 can access and execute the computer executable instructions 110 stored in the memory 108.

The data sources 102 can include a database 102a storing geographical data, one or more cameras or visual sensors 102b mounted on an aircraft or ground vehicle, one or more receivers 102c for receiving geographical data for other sources, or a combination thereof. The database 102a can store geographical data such as 2D digital maps, satellite images or images captured by flying or ground vehicles of various geographical areas. The database 102a may include other geographical information such as names, coordinates, or descriptions of objects or structures within one or more geographical regions. The database 102a can also include data mapping satellite or other geographical images to corresponding geographical regions and respective coordinates. The one or more cameras or visual sensors 102b can be mounted on an aircraft (or a ground vehicle) and configured to capture geographical images of geographical regions in the surrounding environment of (or flown over by) the aircraft (or the ground vehicle). The receiver 102c can include a global positioning system (GPS) receiver or a satellite receiver for receiving GPS data or satellite images, for example, in real time.

The display device 106 may be implemented as a cathode ray tube (CRT) display(s), light emitting diode display (LED), organic light emitting diode display (OLED) liquid crystal display (LCD), plasma display panel (PDP), the like, or a combination thereof. The display device 106 can include a touch screen. The display device 106 can receive geographical data (e.g., digital maps and geographical images) from the one or more data sources 102 and display at least one 2D view and at least one 3D view of a geographical region represented by the received geographical data. For example, each 2D view can present a 2D digital map, whereas the 3D view(s) can include satellite images and/or other geographical images. The satellite images and/or the geographical images can represent top-down views of one or more geographical regions. The vision system 100 can display the 2D and 3D views can on separate display devices 106 (or screens) or on a single display device 106.

The processor 104 and the memory 108 can be integrated in the display device 106 or can be part of another electronic device communicatively coupled to the display device 106.

The processor 104 can access and execute the computer executable instructions 110 stored in the memory 108. The computer executable instructions 110 can include a software application for correlating visual content of 2D and 3D views. The computer executable instructions 110 may also include instructions, which when executed by the processor 104, can cause processing of geographical data received from the data sources 102, and generation and display of the 2D and 3D views on the display device 106.

Upon generation and display of the 2D and 3D views, execution of the computer executable instructions 110 can cause the processor 104 to identify a first image point within the 2D view referenced by a first visual indicator of the 2D view. A user of the vision system 100 can select a visual object or a ROI within the 2D view, for example, by clicking on the visual object or ROI, touching the screen, drawing a contour around the visual object or ROI, or inputting coordinates of the visual object or ROI. In some embodiments, the processor 104 or the display device 106 may automatically select the visual object or the ROI by retrieving respective coordinates from the data sources 102 (e.g., database 102a) or the memory 108. The visual object or the ROI may correspond to physical object or structure in the geographical region represented by the 2D view. The visual object or ROI can be represented by one or more pixels within the 2D view. Upon selection of the visual object or the ROI, the display device 106 can display a first visual indicator, such as a cursor, a shading or color effect, a graphical contour (e.g., a circle, square, rectangle), an overlay, or other graphical object pointing to the selected visual object or ROI. For example, the processor 104 can cause the display device 106 to display a cursor pointing to, an overlay over, or a contour around, the visual object or ROI. The processor 104 can identify an image point (e.g., one or more pixels) within the 2D view associated with the visual object or ROI. For instance, the processor 104 can determine the coordinated, within the 2D view, of the one or more pixels representing the visual object or ROI.

The processor 104 can determine, using information received from the data sources 102, a geographical location in the geographical region corresponding to the image point identified in the 2D view. For example, the processor 104 can use a mapping that links each pixel in the 2D view (or an image frame thereof) to the corresponding geographical location in the geographical region represented by the 2D view (or the image frame thereof). The mapping can be, for example, a table maintained by the database 102a. Each row (or each column) of the table can include an indication of a respective pixel of the 2D view (or an image frame thereof) and the geographical coordinates (e.g., x and y coordinates) representing the geographical location corresponding to that pixel. To determine the geographical location corresponding to the identified image point, the processor 104 can identify a pixel corresponding to the identified image point within the table and read the geographical coordinated mapped to that pixel in the table.

Instead of storing a mapping linking each pixel in the 2D view (or an image frame thereof) to a corresponding geographical location, the vision system 100 can maintain such a mapping for just one or more reference pixels within each image frame of the 2D view. For example, the vision system 100 (or the data sources 102) can maintain such mapping linking each corner pixel of an image frame of the 2D view to a corresponding geographical location. The reference pixel(s) may include one or more other pixels (e.g., other than corner pixel(s)), such as a center pixel of the 2D view or an image frame thereof. The processor 104 can determine a relative position of the identified image point with respect to the one or more reference pixels within the 2D view (or an image frame thereof). For instance, the processor 104 can determine the distance (e.g., in pixels) between the identified image point and each of the reference pixels. The processor 104 may also determine the direction or orientation of each line connecting the identified image point and a reference pixel.

Using the mapping(s) for the reference pixel(s), the processor 104 can determine one or more second geographical locations corresponding to the one or more reference pixel. The processor 104 can then determine the geographical location corresponding to the identified image point using the one or more second geographical locations, the relative position of the identified image point with respect to the reference pixel(s) within the 2D view (or an image frame thereof), and a scaling value associated with the 2D view. For instance, the processor 104 can scale the distance(s) between the identified image point and the reference pixel(s) using the scaling value of the 2D view. The processor 104 can then determine the geographical location corresponding to the identified image point using the scaled distance(s) and the second geographical location(s) corresponding to the reference pixel(s). For example, if the identified image point is a distance D1 away from a reference pixel along a first orientation, the geographical location corresponding to the identified image point would be a distance D2 away from a second geographical location corresponding to the reference pixel along a geographical direction corresponding to the first orientation. The distance D2 is equal to D1 multiplied by the scaling value of 2D view. The scaling value of the 2D view can represent a multiplicative factor representing the relationship between each image distance within the 2D view and a corresponding geographical distance in the geographical region represented by the 2D view.

Figure 2:
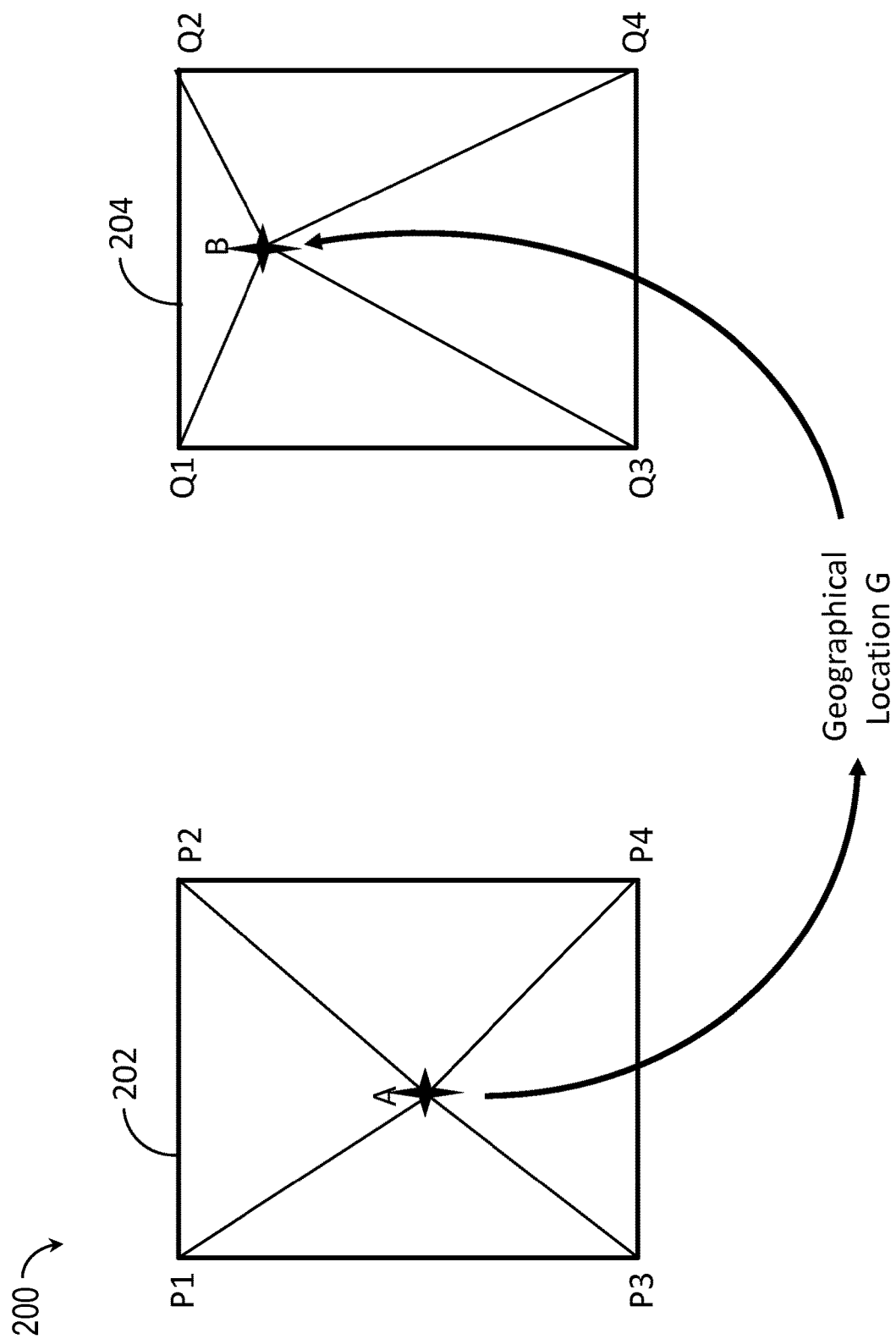
FIG. 2 is a diagram illustrating an example of mapping an image point A in a 2D view to a corresponding image point B in a 3D view, in accordance with some embodiments of the inventive concepts of this disclosure.

Referring now to FIG. 2, a diagram 200 illustrating an example of mapping an image point A in the 2D view 202 to a corresponding image point B in the 3D view 204 is shown. The processor 104 can determine the relative position of the image point A with respect to the corner pixels P1, P2, P3, and P4 in the 2D view 202 (or an image frame thereof). In determining the relative position of the image point A, the processor 104 may determine the distance of the image point A to each of the corner pixels P1, P2, P3, and P4 in the 2D view 202 (or an image frame thereof). The processor 104 can identify the geographical locations corresponding to the pixels P1, P2, P3, and P4 using information (e.g., a mapping linking the corner pixels to corresponding geographical coordinates). The processor 104 can then use the scaling value of the 2D view (or an image frame thereof) and the determined distances between the image point A and the corner pixels P1, P2, P3, and P4 to determine the geographical distances between the geographical locations corresponding to the pixels P1, P2, P3, and P4 and the geographical location corresponding to image point A. Using the determined geographical distances and the geographical locations corresponding to the pixels P1, P2, P3, and P4, the processor 104 can determine the geographical location G corresponding to image point A (e.g., using a triangulation approach).

The processor 104 can determine a second image point (e.g., point B in FIG. 2) within the 3D view corresponding to the geographical location representing the image point (e.g., point A in FIG. 2) identified in the 2D view (or an image frame thereof). For instance, the processor 104 can identify one or more geographical locations corresponding to one or more reference pixels (such as corner pixels Q2, Q3, and Q4) (FOV) of the 3D view, and determine the geographical distance(s) between the identified geographical locations corresponding to reference pixel(s) of the 3D view and the geographical location G corresponding to the image point A in the 2D view. Based on the determined geographical distance(s) and a scaling value of the 3D view (or an image frame thereof), the processor 104 can determine the image point B within the 3D view (or an image frame thereof) corresponding to the image point A in the 2D view (or an image frame thereof).

The vision system 100 can generate the 3D view 204 using images captured by imaging sensors (or cameras) 102b mounted on the aircraft. The vision system 100 can generate and display the 3D view 204 (or images frames thereof) in real time (e.g., within fractions of a second from the time corresponding images are captured by the imaging sensors 102b). Using position and angle of view of each of the imaging sensors 102b (or cameras), the processor 104 can determine the geographical boundaries of the geographical region corresponding to an image frame of the 3D view generated using images captured by the imaging sensors 102b. The processor 104 can determine the distances between the geographical location G corresponding to the image point A and the geographical boundaries (e.g., geographical locations corresponding to the reference pixels Q1, Q2, Q3, and Q4) of the geographical region represented by the generated image frame of the 3D view. Based on such distances and a scaling value of the 3D view (or the corresponding generated image frame), the processor 104 can localize the image point B within the 3D view 204. The image points A and B both represent (or correspond to) the geographical location G.

Once the processor 104 locates the image point B in the 3D view (or in an image frame thereof), the processor 104 can cause the display device 106 to display a visual or graphical indicator of the image point B. For example, the display device 106 can display a cursor referencing (e.g., at or pointing to) the image point B. The display device 106 may display an overlay over the image point B in the 3D view. The display device 106 may display a graphical contour around the image point B, or insert shading or color change at the image point and a surrounding neighborhood.

Figure 3:
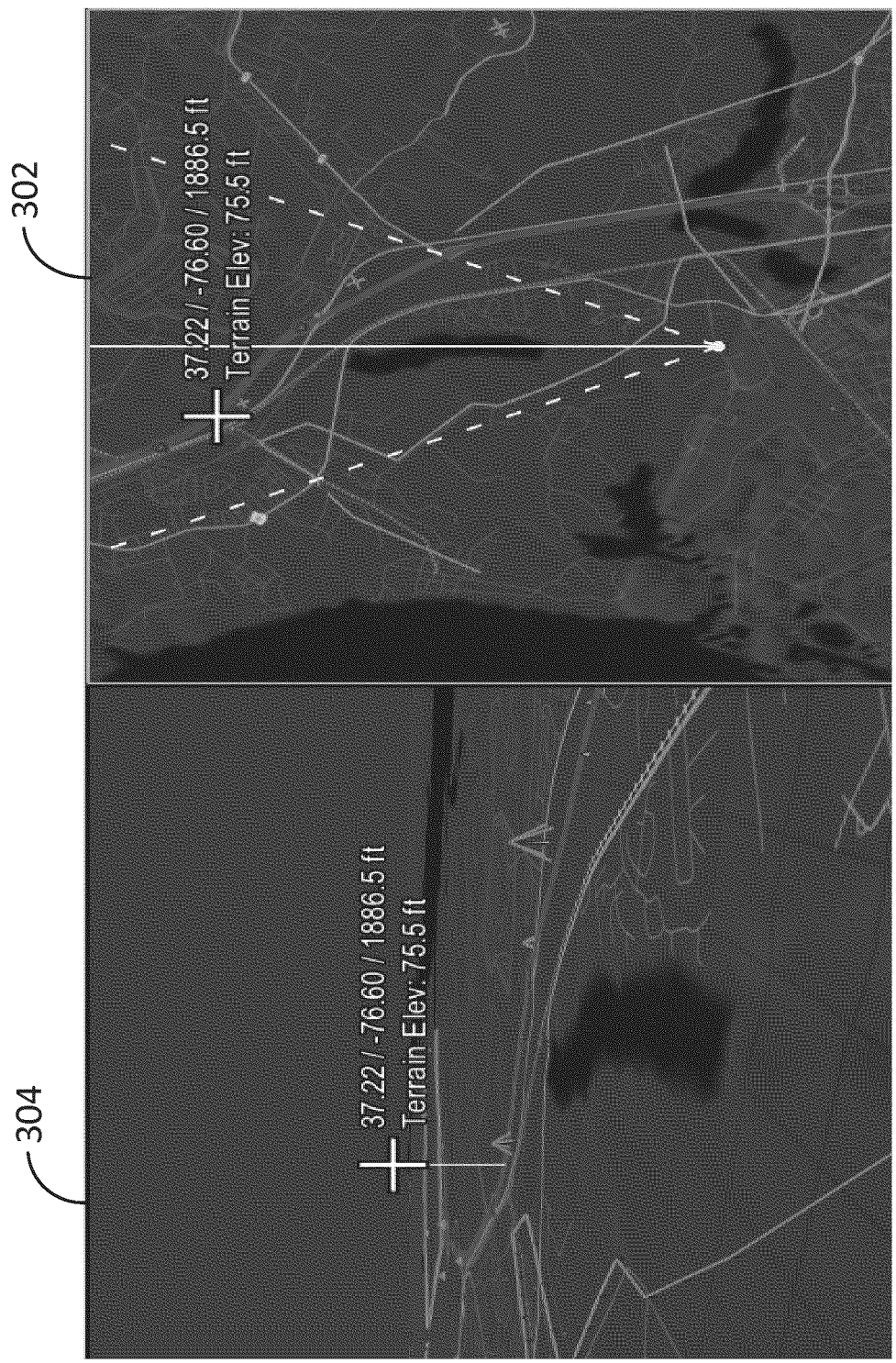
FIG. 3 is an example of 2D and 3D views of a geographic region provided by the vision system of FIG. 1, in accordance with some embodiments of the inventive concepts of this disclosure.

Referring now to FIG. 3, a 2D view 302 and a 3D view 304, of a geographic region, presented by the vision system 100, in accordance with some embodiments of the inventive concepts of this disclosure are shown. The 2D view 302 can include a cursor (or a cross sign) indicative of a target object or a ROI (or image point). The 2D view 302 can also include text indicative of the coordinates and/or a description of a target object or a ROI (or image point). Since the field of view (FOV) associated with the 3D view may be smaller than (or a portion of) that associated with the 2D view, the 2D view 302 can include a visual indicator of the FOV associated with the 3D view. For instance, an image region between the dashed white lines in the 2D view represents the FOV associated with the 3D view 304. In particular, the dashed lines on the left and right sides of the 2D view 302 show the left and right extents of the 3D view 304. The solid white line indicates the center line of the FOV view associated with the 3D view.

In the 3D view 304, the target object or ROI (or corresponding image point) is referenced by another cursor (or cross sign) that is drawn up in the air with a plumb line drawn from it to the ground. Such approach allows the cursor to be seen even when the target object or ROI is hidden behind a structure or other object, such as a building, a hill, a mountain, or other terrain structure the like, without confusing the viewer while still providing an indication of the ground location. The cursor referencing the target object or the ROI in the 3D view 304 can also be set at a specific MSL or AGL altitude and used as a vertical reference for judging the height of terrain and objects in the scene. The 3D view 304 can also include text indicative of, for example, coordinates and/or description of the target object or ROI. In both the 2D and 3D views 302 and 304, the text is placed in close proximity to the cursors (or visual indicators) referencing the target object or ROI.

Figure 4:
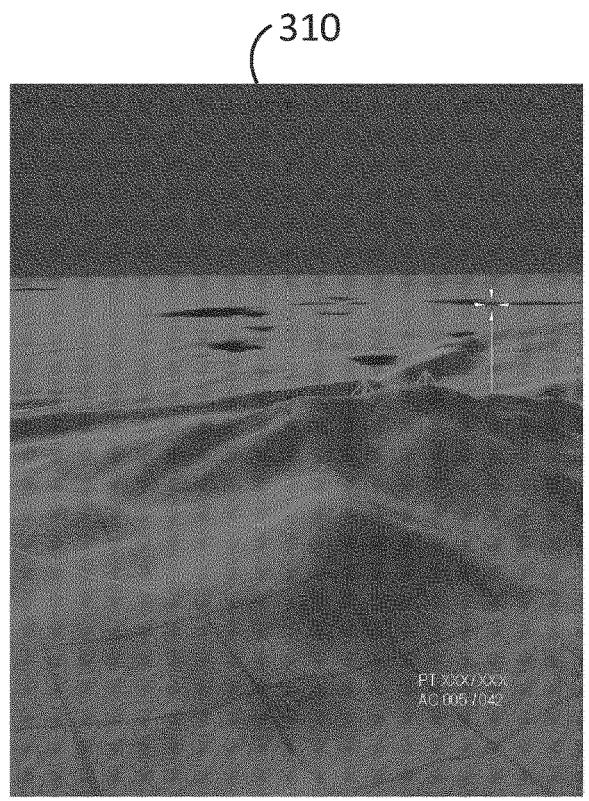
FIG. 4 is another example of 2D and 3D views of another geographic region presented by the vision system of FIG. 1, in accordance with some embodiments of the inventive concepts of this disclosure.
Figure 4:
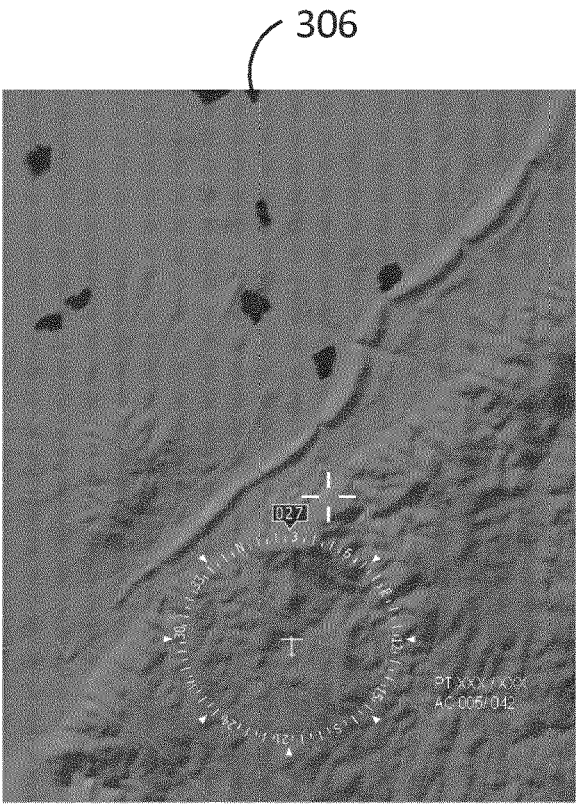
Figure 4:
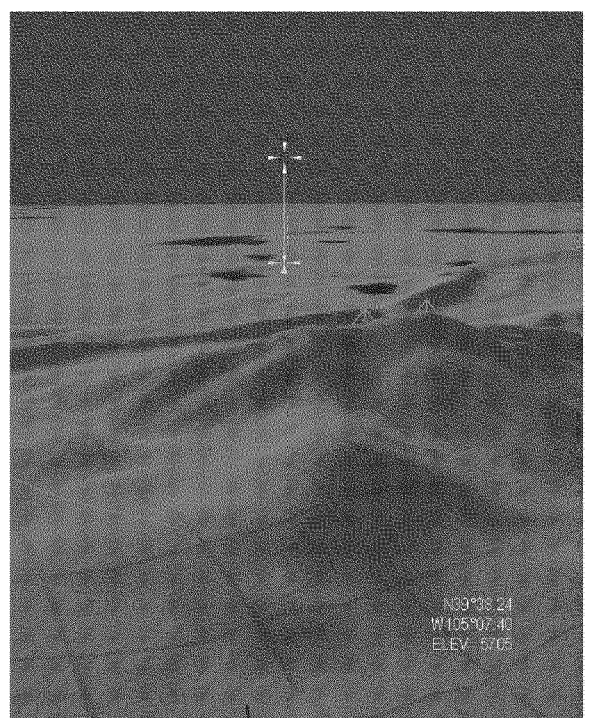
Figure 4:
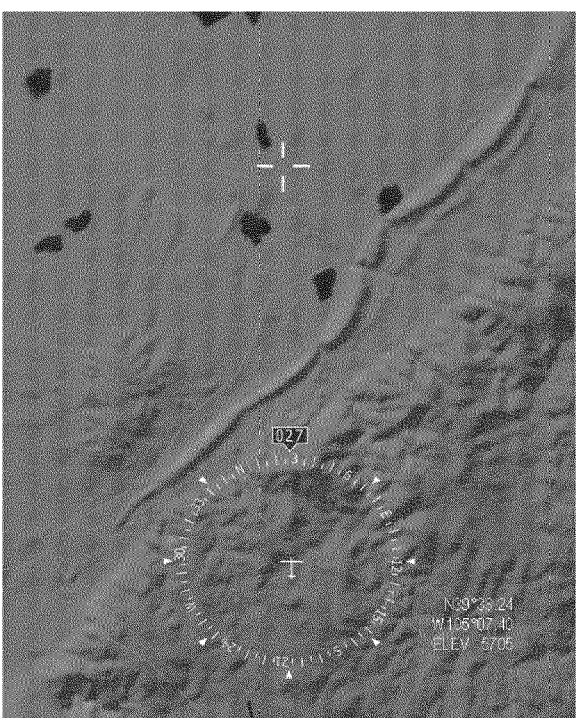

Referring now to FIG. 4, an example 2D and 3D views of another geographic region presented by the vision system of 100 is shown, in accordance with some embodiments of the inventive concepts of this disclosure. The 2D views 306 and 308 are shown on the right whereas the 3D views 310 and 312 are shown on the left. FIG. 4 shows other options for presenting the cursor (or visual indicator) and displaying textual data. The textual data can be presented at fixed locations of the 2D and 3D views 306, 308, 310 and 312, regardless of the positions of the cursors referencing the target object or ROI. The displayed textual data can be indicative of bearing or range information from the aircraft or a waypoint. Also, in the 3D view 312, a "shadow" of the cursor can be projected down onto the terrain whenever the image point corresponding to the target object or ROI is visible (e.g., not hidden behind a structure). As such, the shadow can give an indication as to whether there is a line of sight to the target object or the ROI depending on whether or not the shadow displayed on the 3D view. The shadow can have the same shape as the corresponding cursor or a different shape.

As illustrated in the 3D views 310 and 312, the 2D views (or 3D views) displayed by the vision system 100 can include a graphical object indicative of the position (or x-y coordinates) of the aircraft hosting the vision system 100 within the geographical region represented by the 2D view (or 3D view). For example, the display device 106 can overlay an image of an airplane on the 2D view (or 3D view) at an image point corresponding to the geographical x-y coordinates of the aircraft. The display device 106 can also overlay a compass rose on the 2D view (or 3D view), as shown in 2D views 306 and 308, to indicate the geographical directions (e.g., North, South, east, and West) with respect to the geographical content presented in the 2D view (or 3D view). The display device 106 may employ a single overlay for both the airplane image (or indicator) and the compass rose. For example, the airplane image (or indicator) can be placed at the center of the compass rose as shown in the 2D views 306 and 308. The display of the airplane indicator and the compass rose can allow a user (or viewer) to deduce (or perceive) the position and orientation of the aircraft hosting the vision system 100 within the displayed geographical region or with respect to the target object or ROI.

While the embodiments described above consider mainly identifying a first image point in the 2D view 302 and correlating it with a second corresponding image point in the 3D view 304 via visual indicators, the vision system 100 can first identify an image point in the 3D view 304 and then correlate to a corresponding image point in the 2D view 302. Using the same principles and methods described above, the processor 104 can determine a geographical location corresponding to the image point identified in the 3D view 304, and then determine another image point in the 2D view corresponding to that geographical location. The processor 104 can position a cursor (or a visual indicator) in the 2D view to reference the determined image point therein.

In some embodiments, the 2D view (or the 3D view) can include a sequence of image frames. In such embodiments, the processor 104 can repeat, for a plurality of frames of the 2D view, (1) identifying an image point in the 2D view (or in the 3D view), (2) determining the geographical location corresponding to the identified image point, (3) determining a second image point within the 3D view (or 2D view) corresponding to the determined geographical location, and (4) positioning a visual indicator in the 3D view (or 2D view) to reference the second image point. Applying these processes for each image frame allows for synchronizing visual indicators in the 2D and 3D views to consistently and timely reference a target object or ROI in both the 2D and 3D views.

Figure 5:
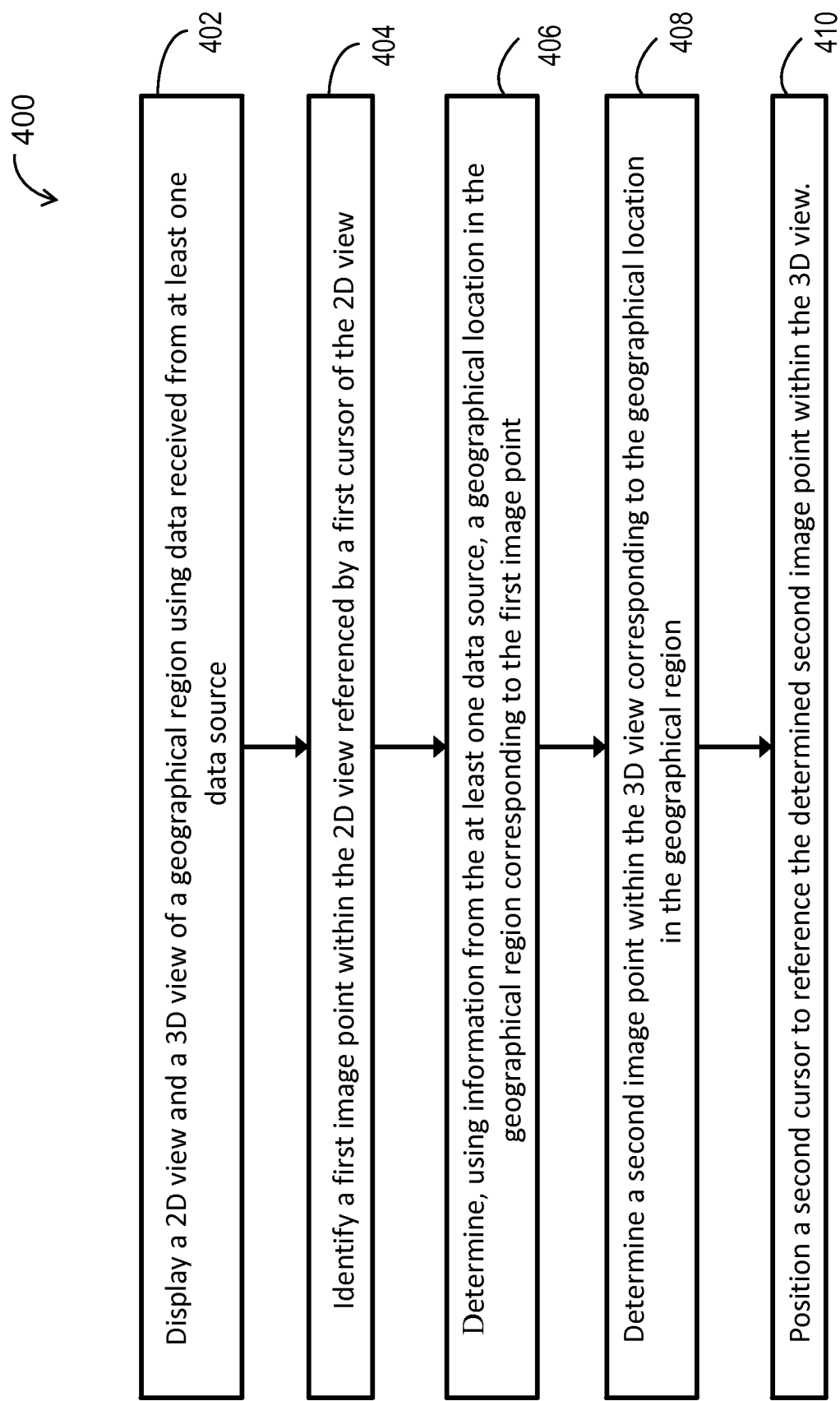
FIG. 5 is a flow diagram illustrating a method of correlating visual content in two-dimensional (2D) and three-dimensional (3D) views of a geographical region. in accordance with some embodiments of the inventive concepts of this disclosure.

Referring now to FIG. 5 a method 400 of correlating visual content in 2D and 3D scenes of geographical regions can include a display device of an aircraft displaying a 2D view and a 3D view of a geographical region using data received from at least one data source (step 402). The 2D and 3D views can represent top-down views of the geographical region. The method 400 can include at least one processor identifying a first image point within the 2D view referenced by a first cursor (or first visual indicator) of the 2D view (step 404). The method 400 can include the at least one processor determining, using information from the at least one data source, a geographical location in the geographical region corresponding to the first image point (step 406). The method 400 can include the at least one processor determining a second image point within the 3D view corresponding to the geographical location in the geographical region (step 408). The method 400 can include the at least one processor positioning a second cursor (or a second visual indicator) to reference the determined second image point within the 3D view (step 410).

The method 400 can be performed by the vision system 100 as described above with regard to FIGS. 1-4. The method 400 can alternatively include identifying the first image point in the 3D view, determining a geographical location corresponding to the first image point, mapping the determined geographical location to a second image point in the 2D view, and positioning a second visual indicator to reference the determined second image point within the 3D view. In some embodiments, the method 400 can include (e.g., at step 402) the at least one processor monitoring 2D and 3D views displayed by the display device. For instance, the processor can monitor image frames displayed or being displayed as part of the 2D view 302 or the 3D view 304.

The method described herein (e.g., with regard to FIG. 5) can be implemented using software, hardware, firmware, or a combination thereof. In some embodiments, methods described herein can be implemented as computer executable instructions 110 (e.g., a software application), which when executed, can cause the processor 104 to correlate visual content associated with 2D and 3D views of a geographical region as described above.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the inventive concepts disclosed herein. The order or sequence of any operational flow or method operations may be varied or re-sequenced according to alternative embodiments. Other substitutions, modifications, changes, and omissions may be made in the design, operating conditions and arrangement of the exemplary embodiments without departing from the broad scope of the inventive concepts disclosed herein.

What is claimed is:

1. A system for correlating visual content in two-dimensional (2D) and three-dimensional (3D) scenes of a geographical region, the system comprising:
at least one data source for providing geographical data;
a display device of an aircraft configured to simultaneously display a 2D view and a 3D view of a geographical region using data received from the at least one data source, the 2D and 3D views representing top-down views of the geographical region; and
at least one processor, communicatively coupled to the at least one data source and the display device, configured to:
receive an indication of a user selection of a first visual representation of a physical object within the 2D view on the display device, the user selection causing a first visual indicator of the 2D view to point to the first visual representation of the physical object within the 2D view;
identify, responsive to the user selection of the first visual representation of the physical object within the 2D view, a first image point within the 2D view referenced by the first visual indicator of the 2D view pointing to the first visual representation of the physical object within the 2D view;
determine, using information received from the at least one data source, a geographical location corresponding to the first image point in the geographical region;
determine a second image point within the 3D view corresponding to the determined geographical location, the second image point associated with a second visual representation of the physical object within the 3D view; and
automatically position a second visual indicator of the 3D view at the determined second image point within the 3D view, the first and second visual indicators automatically synchronized spatially and temporally to point to the physical object across a plurality of frames of the 2D and 3D views, the second visual indicator remaining visible in the 3D view even when the second visual representation of the physical object is hidden behind a structure or other object in the 3D view.

2. The system of claim 1, wherein the determined geographical location corresponding to the first image point is a first geographical location, and determining the first geographical location includes:
determining, using the information from the at least one data source, a second geographical location in the geographical region corresponding to a reference pixel of the 2D view;
determining a position of a second pixel, corresponding to the first image point, relative to the reference pixel within the 2D view; and
determining the first geographical location in the geographical region using the second geographical location in the geographical region, the position of the second pixel within the 2D view relative to the reference pixel, and a scaling value associated with the 2D view.

3. The system of claim 1, wherein determining a geographical location in the geographical region corresponding to the first image point includes using a mapping to determine the geographical location in the geographical region, the mapping linking each pixel of the 2D view to a corresponding geographical location in the geographical region.

4. The system of claim 1, wherein the processor is further configured to cause the display device to display coordinates of the determined geographical location corresponding to the first image point on the 3D view.

5. The system of claim 1, wherein the processor is further configured to cause the display device to display, on the 2D view, an indication of a terrain displayed in the 3D view.

6. The system of claim 1, wherein the 2D and the 3D views represent synthetic views of the geographical region.

7. The system of claim 1, wherein the at least one processor is further configured to repeat, for a plurality of frames of the 2D view (1) identifying the first image point referenced by the first visual indicator, (2) determining the geographical location, in the geographical region, corresponding to the identified first image point, (3) determining the second image point within the 3D view corresponding to the determined geographical location, and (4) positioning the second visual indicator of the 3D view at the determined second image point within the 3D view.

8. The system of claim 1, wherein the at least one data source includes a plurality of cameras mounted to the aircraft and capturing content used to generate the 3D view.

9. The system of claim 8, wherein the geographical location is a first geographical location and determining a second image point within the 3D view corresponding to the first geographical location includes:
    determining, using position and angle of view of each of the plurality of cameras, a second geographical location in the geographical region corresponding to a reference pixel of the 3D view;
    determining a distance between the first geographical location and the second geographical location in the geographical region; and
    determining the second image point within the 3D view using the determined distance, the second geographical location in the geographical region, and a scaling value associated with the 3D view.

10. A method of correlating visual content in two-dimensional (2D) and three-dimensional (3D) scenes of geographical regions comprising:
    displaying, by a display device of an aircraft, a 2D view and a 3D view of a geographical region simultaneously using data received from at least one data source, the 2D and 3D views representing top-down views of the geographical region;
    receiving, by the display device, an indication of a user selection of a first visual representation of a physical object within the 2D view, the user selection causing a first visual indicator of the 2D view to point to the first visual representation of the physical object within the 2D view;
    identifying, by at least one processor, responsive to the user selection of the first visual representation of the physical object within the 2D view, a first image point within the 2D view referenced by the first visual indicator of the 2D view pointing to the first visual representation of the physical object within the 2D view;
    determining, by the at least one processor, using information from the at least one data source, a geographical location in the geographical region corresponding to the first image point;
    determining, by the at least one processor, a second image point within the 3D view corresponding to the geographical location in the geographical region, the second image point associated with a second visual representation of the physical object within the 3D view; and
    automatically positioning, by the at least one processor, a second visual indicator at the determined second image point within the 3D view, the first and second visual indicators automatically synchronized spatially and temporally to point to the physical object across a plurality of frames of the 2D and 3D views, the second visual indicator remaining visible in the 3D view even when the second visual representation of the physical object is hidden behind a structure or other object in the 3D view.

11. The method of claim 10, wherein the determined geographical location corresponding to the first image point is a first geographical location, and determining the first geographical location includes:
    determining, using the information from the at least one data source, a second geographical location in the geographical region corresponding to a reference pixel of the 2D view;
    determining a position of a second pixel, corresponding to the first image point, relative to the reference pixel within the 2D view; and
    determining the first geographical location in the geographical using the second geographical location in the geographical region, the position of the second pixel within the 2D view relative to the reference pixel, and a scaling value associated with the 2D view.

12. The method of claim 10, wherein determining a geographical location in the geographical region corresponding to the first image point includes using a mapping to determine the geographical location in the geographical region, the mapping linking each pixel of the 2D view to a corresponding geographical location in the geographical region.

13. The method of claim 10 further comprising causing, by the at least one processor, the display device to display coordinates of the determined geographical location on the 3D view.

14. The method of claim 10 further comprising causing, by the at least one processor, the display device to display, on the 2D view, an indication of a terrain displayed in the 3D view.

15. The method of claim 10, wherein the 2D and the 3D views represent synthetic views of the geographical region.

16. The method of claim 10 further comprising repeating, by the at least one processor for a plurality of frames of the 2D view (1) identifying the first image point referenced by the first visual indicator, (2) determining the geographical location, in the geographical region, corresponding to the identified first image point, (3) determining the second image point within the 3D view corresponding to the determined geographical location, and (4) positioning the second visual indicator of the 3D view at the determined second image point within the 3D view.

17. The method of claim 10, wherein the at least one data source includes a plurality of cameras mounted to the aircraft and capturing content used to generate the 3D view.

18. The method of claim 17, wherein the geographical location is a first geographical location and determining a second image point within the 3D view corresponding to the first geographical location includes:

determining, using position and angle of view of each of the plurality of cameras, a second geographical location in the geographical region corresponding to a reference pixel of the 3D view;

determining a distance between the first geographical location and the second geographical location in the geographical region; and determining the second image point within the 3D view using the determined distance, the second geographical location in the geographical region, and a scaling value associated with the 3D view.

19. A non-transitory computer readable medium including computer executable instructions stored thereon, the computer executable instructions, when executed by at least one processor, cause the at least one processor to:

monitor display of a 2D view and a 3D view of a geographical region on a display device of an aircraft, the 2D and 3D views displayed simultaneously on the display device using data received from at least one data source, the 2D and 3D views representing top-down views of the geographical region;

receive an indication of a user selection of a first visual representation of a physical object within the 2D view on the display device, the user selection causing a first visual indicator of the 2D view to point to the first visual representation of the physical object within the 2D view;

identify, responsive to the user selection of the first visual representation of the physical object within the 2D view, a first image point within the 2D view referenced by the first visual indicator of the 2D view pointing to the first visual representation of the physical object within the 2D view;

determine, using information from the at least one data source, a geographical location in the geographical region corresponding to the first image point;

determine a second image point within the 3D view corresponding to the geographical location in the geographical region, the second image point associated with a second visual representation of the physical object within the 3D view; and automatically position a second visual indicator at the determined second image point within the 3D view, the first and second visual indicators automatically synchronized spatially and temporally to point to the physical object across a plurality of frames of the 2D and 3D views, the second visual indicator remaining visible in the 3D view even when the second visual representation of the physical object is hidden behind a structure or other object in the 3D view.

20. The non-transitory computer readable medium of claim 19, wherein the 2D and the 3D views represent synthetic views of the geographical region.

\* \* \* \* \*